US012371608B1

(12) United States Patent
Guo et al.

(10) Patent No.: US 12,371,608 B1
(45) Date of Patent: Jul. 29, 2025

(54) SUSPENDED SAND DRAGGING FIBERS AND PREPARATION METHODS THEREOF

(71) Applicants: CHENGDU LEPS TECHNOLOGY CO., LTD., Sichuan (CN); SOUTHWEST PETROLEUM UNIVERSITY, Sichuan (CN)

(72) Inventors: Jianchun Guo, Chengdu (CN); Shan Ren, Chengdu (CN); Bin Liu, Chengdu (CN); Yuxuan Liu, Chengdu (CN); Yang Lu, Chengdu (CN); Qianli Lu, Chengdu (CN); Shaobin Zhang, Chengdu (CN); Hangyu Zhou, Chengdu (CN); Qingsong Guo, Chengdu (CN); Jiapeng Zhang, Chengdu (CN); Tao Zhang, Chengdu (CN); Hongmei Wang, Chengdu (CN); Hengbo Zuo, Chengdu (CN); Yongxin Zhu, Chengdu (CN); Su Diao, Chengdu (CN)

(73) Assignees: CHENGDU LEPS TECHNOLOGY CO., LTD., Chengdu (CN); SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 19/090,383

(22) Filed: Mar. 25, 2025

(30) Foreign Application Priority Data

Dec. 25, 2024 (CN) .......................... 202411918933.9

(51) Int. Cl.
*C09K 8/80* (2006.01)
*D06M 15/643* (2006.01)
(Continued)

(52) U.S. Cl.
CPC ............. *C09K 8/80* (2013.01); *D06M 15/643* (2013.01); *D06M 15/705* (2013.01); *D06M 23/10* (2013.01); *C09K 2208/08* (2013.01)

(58) Field of Classification Search
CPC ... C09K 8/80; C09K 2208/08; D06M 15/643; D06M 15/705; D06M 23/10
See application file for complete search history.

(56) References Cited

U.S. PATENT DOCUMENTS

2010/0260998 A1* 10/2010 Waicukauski .......... C03C 25/47
977/773
2017/0183562 A1 6/2017 Nguyen et al.
2020/0308476 A1* 10/2020 Alekseev ............... E21B 33/138

FOREIGN PATENT DOCUMENTS

AU 2016277592 A1 1/2017
CN 108676553 A 10/2018
(Continued)

OTHER PUBLICATIONS

First Office Action in Chinese Application No. 202411918933.9 mailed on Feb. 28, 2025, 14 pages.
(Continued)

*Primary Examiner* — Aiqun Li
(74) *Attorney, Agent, or Firm* — Porus IP LLC

(57) ABSTRACT

A suspended sand dragging fiber and a preparation method thereof, the method including: dispersing nanoparticles into a first solvent, adding a coating agent and a flexibilizer to the first solvent, and stirring and aging to obtain a surface treatment agent; adding a surfactant to a second solvent, adding alkyl polyether siloxane to the second solvent after the surfactant is dissolved in the second solvent, and stirring to obtain a finishing agent; transferring the surface treatment agent to a sizing trough of a sizing machine, sizing polyester fibers using the sizing machine, and drying and curing to obtain surface-modified fibers, and diluting the finishing (Continued)

agent to obtain a finishing agent solution, and treating the surface-modified fibers with the finishing agent solution to obtain the suspended sand dragging fiber.

5 Claims, 3 Drawing Sheets

(51) Int. Cl.
*D06M 15/705* (2006.01)
*D06M 23/10* (2006.01)

(56) References Cited

FOREIGN PATENT DOCUMENTS

| CN | 108704483 A | 10/2018 |
|---|---|---|
| CN | 109594347 A | 4/2019 |
| CN | 109943301 A | 6/2019 |
| CN | 110479121 A | 11/2019 |
| CN | 112778508 A | 5/2021 |
| CN | 113150757 A | 7/2021 |
| CN | 115058241 A | 9/2022 |
| CN | 117229768 A | 12/2023 |
| CN | 117779330 A | 3/2024 |
| CN | 118221981 A | 6/2024 |
| CN | 118223305 A | 6/2024 |
| CN | 118272947 A | 7/2024 |
| CN | 118273126 A | 7/2024 |
| CN | 118360795 A | 7/2024 |
| GB | 201619738 | 1/2017 |
| WO | 2016100048 A1 | 6/2016 |
| WO | 2020247594 A1 | 12/2020 |

OTHER PUBLICATIONS

Notification to Grant Patent Right for Invention in Chinese Application No. 202411918933.9 mailed on Mar. 14, 2025, 4 pages.

Jung, Imjoo et al., Preparation and Evaluation of Graphene/Polyvinyl Alcohol-coated Thermoplastic Elastomer Filament, Fibers and Polymers, 24(1): 285-297, 2023.

Sun, Ruizhe, Technique and Talent: the Inside-power and Support for Building Textile Strength Country, China Fiber Inspection, 2, 2013, 10 pages.

Luo, Huali et al., Research Status Quo and Review of Underwater Superoleophobic Coating, Paint & Coatings Industry, 9, 2016, 8 pages.

* cited by examiner

100

```
┌─────────────────────────────────────────────────────┐
│ Dispersing nanoparticles into a first solvent,      │ ─── 110
│ adding a coating agent and a flexibilizer to the    │
│ first solvent, and stirring and aging to obtain a   │
│ surface treatment agent                             │
└─────────────────────────────────────────────────────┘
                          │
                          ▼
┌─────────────────────────────────────────────────────┐
│ Adding a surfactant to a second solvent, adding     │ ─── 120
│ alkyl polyether siloxane to the second solvent      │
│ after the surfactant is dissolved in the second     │
│ solvent, and stirring to obtain a finishing agent   │
└─────────────────────────────────────────────────────┘
                          │
                          ▼
┌─────────────────────────────────────────────────────┐
│ Transferring the surface treatment agent to a       │ ─── 130
│ sizing trough of a sizing machine, sizing polyester │
│ fibers using the sizing machine, and drying and     │
│ curing to obtain surface-modified fibers            │
└─────────────────────────────────────────────────────┘
                          │
                          ▼
┌─────────────────────────────────────────────────────┐
│ Diluting the finishing agent to obtain a finishing  │ ─── 140
│ agent solution, and treating the surface-modified   │
│ fibers with the finishing agent solution to obtain  │
│ the suspended sand dragging fiber                   │
└─────────────────────────────────────────────────────┘
```

FIG. 1

SUSPENDED SAND DRAGGING FIBERS AND PREPARATION METHODS THEREOF

CROSS REFERENCE TO RELATED APPLICATIONS

The present application claims priority to Chinese patent application No. 202411918933.9, filed on Dec. 25, 2024, the entire contents of which are incorporated herein by reference.

TECHNICAL FIELD

The present disclosure relates to the field of oil and gas reservoir extraction, and in particular, to a suspended sand dragging fiber and a preparation method thereof.

BACKGROUND

Currently, in fractured wells, the proppant is only placed within the main and branch fractures, with a limited placement distance. The proppant is mainly deposited at the bottom of the fractures, leading to uneven cross-section distribution and failing to provide effective support to fractures at all levels. Moreover, while the volume fracturing process significantly increases the single well production, the inevitable proppant flowback during flowback testing and production processes leads to proppant embedding into the reservoir, resulting in severe erosion damage to the testing and production processes. This increases downhole operation costs and severely impacts both single well production and safety.

Fiber fracturing technology, by adding different types of fiber materials to the fracturing fluid system, can effectively enhance the suspending performance of the proppant in the fracturing fluid system and reduce the proppant flowback. However, in the actual application of fibers in fracturing operations, their dispersion becomes a key challenge. In order to achieve the best effect of the efficient placement technology of the proppant in fractured wells, it is necessary to develop fiber surface-modified materials with strong sand suspending capability, good dispersibility, and the ability to control proppant flowback, ensuring that the fibers can be evenly distributed in the fracturing fluid and form an effective network structure, thereby enhancing the placement effectiveness of the proppant and reducing proppant flowback.

Fiber surface modification manners are mainly divided into chemical treatment (such as redox treatment, coupling agent treatment, chemical grafting, etc.), plasma modification, corona treatment, and surface thermal treatment (heating, melting, or thermosetting). The coating manner involves covering the fiber surface with a layer of polymer, nanomaterials, metal particles, inorganic non-metals, or their composites, through physical or chemical deposition, coating, sol-gel manners, and other coating processes. After coating modification, the wettability of the fiber surface is altered, and the compatibility between the fiber and the matrix is increased. Chinese Patent Application No. CN112778508A discloses a water-soluble polyester slurry for sizing a short fiber and a preparation method thereof, which has strong adhesion to polyester fibers and is easy to remove after sizing, resulting in an improvement in the mechanical properties of the fibers after sizing. However, the slurry needs to be melted at 90° C. before usage, which is not easy for production and operation. Besides, after coating treatment, the force of interaction between fiber bundles becomes too strong, leading to poor dispersibility, reduced flexibility and elasticity, and negatively affecting the network structure performance of the fibers. This indicates that simply modifying the fiber surface by coating significantly reduces the suspension and placement effectiveness of the fibers in the proppants of the fracturing fluid system.

Therefore, there is a need to provide a suspended sand dragging fiber and a preparation method thereof, which improves the interaction between polyester fibers and proppant through a surface treatment agent, and at the same time enhances the dispersibility and the mechanical properties of the fibers through a finishing agent, thereby achieving an efficient placement of the proppant.

SUMMARY

One or more embodiments of the present disclosure provide a method for preparing a suspended sand dragging fiber, comprising: dispersing nanoparticles into a first solvent, adding a coating agent and a flexibilizer to the first solvent, and stirring and aging to obtain a surface treatment agent; adding a surfactant to a second solvent, adding alkyl polyether siloxane to the second solvent after the surfactant is dissolved in the second solvent, and stirring to obtain a finishing agent; transferring the surface treatment agent to a sizing trough of a sizing machine, sizing polyester fibers using the sizing machine, and drying and curing to obtain surface-modified fibers; and diluting the finishing agent to obtain a finishing agent solution, and treating the surface-modified fibers with the finishing agent solution to obtain the suspended sand dragging fiber.

One or more embodiments of the present disclosure provide a suspended sand dragging fiber, which is prepared by the method for preparing the suspended sand dragging fiber.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein:

FIG. 1 is a flowchart illustrating a process of a method for preparing a suspended sand dragging fiber according to some embodiments of the present disclosure;

DETAILED DESCRIPTION

Figure 2:
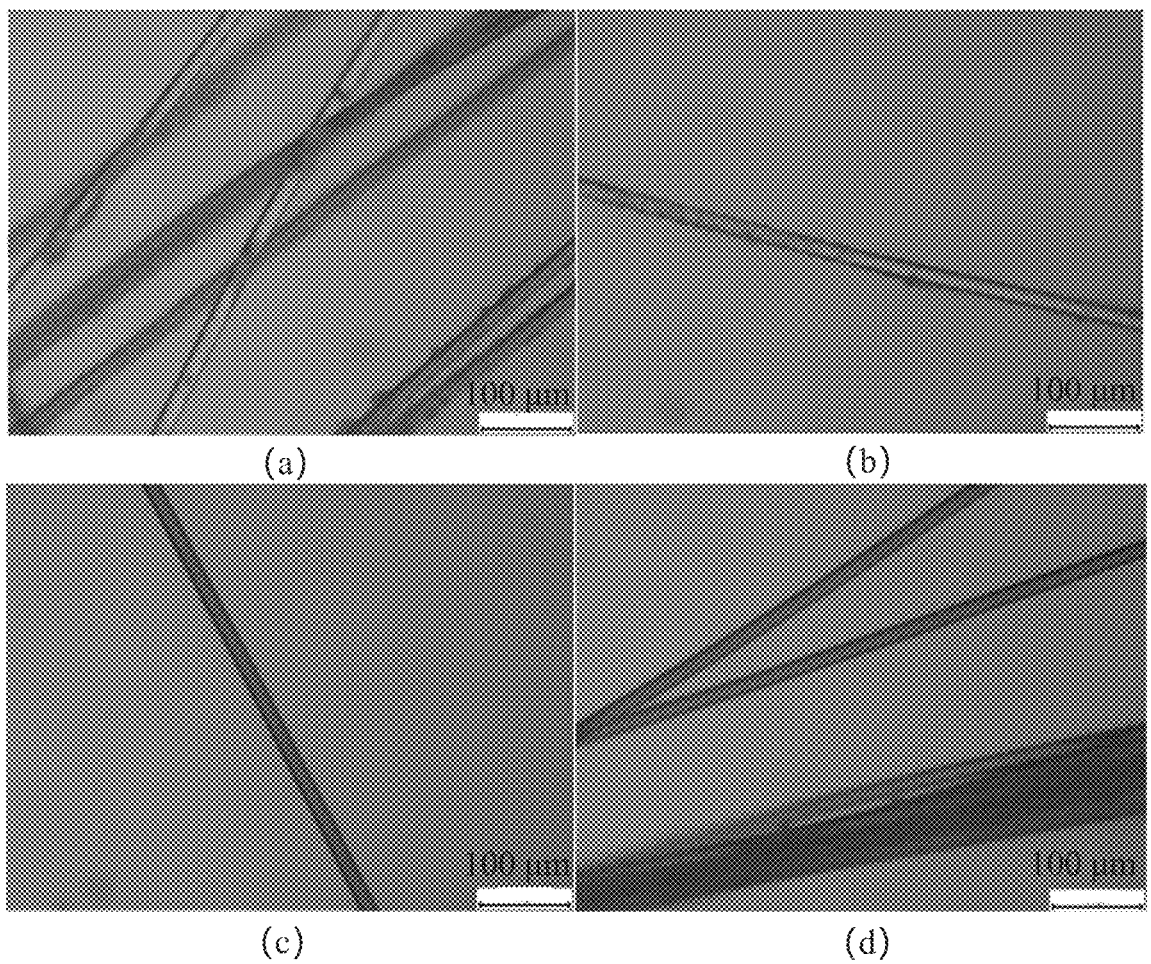
FIG. 2 is a diagram illustrating comparison of microstructures of fibers before and after treatment according to embodiments according to the present disclosure.

In order to more clearly illustrate the technical solutions of the embodiments of the present disclosure, the following will briefly introduce the accompanying drawings that need to be used in the description of the embodiments. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

Unless the context clearly suggests an exception, the words "a", "an", "one", and/or "the" do not refer specifically to the singular, but may also include the plural. Generally, the terms "including" and "comprising" suggest only the inclusion of clearly identified steps and elements that do not constitute an exclusive list, and the method or device may also include other steps or elements.

Flowcharts are used in the present disclosure to illustrate operations performed by a system in accordance with embodiments of the present disclosure. It should be appreciated that the preceding or following operations are not necessarily performed in an exact sequence. Instead, steps may be processed in reverse order or simultaneously. Also, it is possible to add other operations to these processes or remove a step or steps from them.

FIG. 1 is a flowchart illustrating a process of a method for preparing a suspended sand dragging fiber according to some embodiments of the present disclosure. As shown in FIG. 1, a process 100 includes following steps.

Step 110, dispersing nanoparticles into a first solvent, adding a coating agent and a flexibilizer to the first solvent, and stirring and aging to obtain a surface treatment agent.

In some embodiments, the first solvent is also referred to as a solvent A.

The nanoparticles refer to particles with a size in a range of 1 nanometer and 100 nanometers. The nanoparticles used in the present disclosure include one or more nanoparticle silicon dioxide ($SiO_2$), nanoparticle titanium dioxide ($TiO_2$), nanoparticle kaolin ($Al_2[(OH)_4/Si_2O_5]$), and graphene. The nanoparticles may also be other optional materials.

The first solvent refers to a solvent for preparing the surface treatment agent. The first solvent includes one or more ethylene glycol butyl ether ($C_6H_{14}O_2$), glycerol ($C_3H_8O_3$), and water. The first solvent may also be other optional solvents.

In some embodiments, a manner for dispersing the nanoparticles includes but is not limited to, ultrasonic dispersion, mechanical stirring dispersion, chemical dispersion, or the like.

The coating agent is used to apply a continuous film of polymer compounds to the surface of fibers. The polymer compounds are called the coating agent. In some embodiments, the coating agent includes one or more of a silane coupling agent, a polyurethane emulsion, an epoxy resin emulsion, a styrene-acrylic emulsion, or the like. The coating agent may also be other optional materials.

The flexibilizer is a chemical substance used to change the friction coefficient of fibers. In some embodiments, the flexibilizer includes one or more of polyethylene glycol ($HO(CH_2CH_2O)_nH$)600, azelaic acid ($C_9H_{16}O_4$), octanoic acid ($C_8H_{16}O_2$), or the like. The flexibilizer may also be other optional chemical substances.

Aging refers to the process in which the solution is allowed to stand and be stored for a certain time under certain conditions after the precipitation is complete during the process of precipitation. The purpose of aging is to allow raw material components in the solution to be fully reacted or to allow suspended material to settle.

In some embodiments, the first solvent after the addition of the coating agent and the flexibilizer is stirred and aged. A stirring manner includes a variety of means, for example, mechanical stirring, manual stirring, etc. A stirring time and an aging time may be set by staff based on experience. For example, the stirring time is in a range of 0.5 h to 1 h and the aging time is 24 h. For example, the stirring time is 0.8 h and the aging time is 24 h. The stirring time and the aging time may also be other optional times.

The surface treatment agent refers to an agent used to treat the surface of a material in some way to achieve a specific purpose. In some embodiments, raw material components in the surface treatment agent include the nanoparticles, the first solvent, the coating agent, and the flexibilizer. A mass percentage of each of the raw material components in the surface treatment agent may be preset according to practical needs.

In some embodiments, in the surface treatment agent, a mass percentage of the coating agent is in a range of 0.1% to 10.0%, a mass percentage of the flexibilizer is in a range of 0.1% to 3.0%, a mass percentage of the nanoparticles is in a range of 0.1% to 2.0%, and a remaining is the first solvent. The sum of the mass percentages of the raw material components in the surface treatment agent is 100%. For example, the mass percentage of the coating agent is 1%, the mass percentage of the flexibilizer is 1%, the mass percentage of the nanoparticles is 1%, and the mass percentage of the first solvent is 97%. For another example, the mass percentage of the coating agent is 2%, the mass percentage of the flexibilizer is 3%, the mass percentage of the nanoparticles is 2%, the mass percentage of the first solvent is 93%, and so on. The range of the mass percentage of the coating agent, the range of the mass percentage of the flexibilizer, and the range of the mass percentage of the nanoparticles may be other optional ranges.

Step 120, adding a surfactant to a second solvent, adding alkyl polyether siloxane to the second solvent after the surfactant is dissolved in the second solvent, and stirring to obtain a finishing agent.

In some embodiments, the second solvent may also be referred to as a solvent B.

The surfactant dissolved in the second solvent refers to that the surfactant is uniformly dispersed in the second solvent. In some embodiments, the alkyl polyether siloxane may be added after the surfactant is completely dissolved in the second solvent. In some embodiments, a dissolution of the surfactant may be determined by observing crystallization in the second solvent. The fewer crystals in the second solvent, the more surfactant is dissolved, and when no crystals may be observed, it is determined that the surfactant is completely dissolved in the second solvent.

A stirring manner after the addition of the alkyl polyether siloxane may be the same as the stirring manner in step 110, or other stirring manners may be adopted.

A stirring time after the addition of the alkyl polyether siloxane may be set by staff based on experience. In some embodiments, the stirring time after the addition of the alkyl polyether siloxane is in a range of 5 min to 30 min. For example, the stirring time after the addition of the alkyl polyether siloxane is 5 min, 10 min, or 20 min. The stirring time after the addition of the alkyl polyether siloxane may also be other optional time.

The surfactant refers to compounds that significantly reduce the surface tension or interfacial tension between two liquids, liquid and gas, or liquid and solid. In some embodiments, the surfactant is a cationic surfactant. The cationic surfactant refers to a surfactant in which the hydrophilic group generates cations.

In some embodiments, the cationic surfactant includes one or more of dodecylbenzyldimethylammonium chloride, cetyltrimethylammonium chloride ($C_{19}H_{42}ClN$), dodecyldimethylamine oxide ($C_{14}H_{31}NO$), ethylendiaminedi(ditallowdimethylammonium chloride ($C_{34}H_{72}ClN$)), alkyl polyether amine, or the like. The cationic surfactant may also be other compounds.

The second solvent refers to a solvent used to prepare the finishing agent. In some embodiments, the second solvent includes one or more of acetone ($C_3H_6O$), ethanol ($C_2H_6O$), and deionized water. The second solvent may also be other optional solvents.

The finishing agent refers to an agent used to modify the surface properties of fibers. In some embodiments, raw material components in the finishing agent include the surfactant, the second solvent, and the alkyl polyether siloxane. A mass percentage of each of the raw material components in the finishing agent may be predetermined according to practical needs.

In some embodiments, in the finishing agent, a mass percentage of the surfactant is in a range of 5% to 15.0%, a mass percentage of the alkyl polyether siloxane is in a range of 5% to 15.0%, and a remaining is the second solvent. The sum of the mass percentages of the raw material components in the finishing agent is 100%. For example, the mass percentage of the surfactant is 5%, the mass percentage of the alkyl polyether siloxane is 5%, and the mass percentage of the second solvent is 90%. As another example, the mass percentage of the surfactant is 10%, the mass percentage of the alkyl polyether siloxane is 10%, and the mass percentage of the second solvent is 80%. The range of the mass percentage of the surfactant and the range of the mass percentage of the alkyl polyether siloxane may be other optional ranges.

Step 130, transferring the surface treatment agent to a sizing trough of a sizing machine, and sizing polyester fibers using the sizing machine, and drying and curing to obtain surface-modified fibers.

The sizing machine is a device used for sizing cotton or cotton-synthetic fiber blended yarns. In some embodiments of the present disclosure, the sizing machine is used to attach the surface treatment agent to the surface of the polyester fibers, which forms a skin film to encapsulate the surface of the polyester fibers after drying.

In some embodiments, the sizing machine includes a yarn guide roller, a sizing trough, a padding roller, a sizing roller, a press roller, or the like. The yarn guide roll is used to draw the polyester fibers to move, and the sizing trough is used to accommodate the surface treatment agent. The padding roller is disposed in the sizing trough, and at least a portion of the padding roller is in contact with the surface treatment agent. The padding roller is used to submerge the polyester fibers in the surface treatment agent.

In some embodiments, the padding roller and the pressure roller occur in pairs and at least a portion of the padding roller is not in contact with the surface treatment agent. The sizing roller is used to pull the submerged polyester fibers out of the surface treatment agent. By generating pressure between the sizing roller and the pressure roller, the surface treatment agent on the surface of the polyester fibers is squeezed out, resulting in the sized polyester fibers. In some embodiments, depending on the structure of the sizing machine, the padding and squeezing manner may include single padding and single squeezing, single padding and double squeezing, double padding and double squeezing, or the like. When the sizing machine includes a padding roller and a pair of sizing roller and pressure roller, the padding and squeezing manner is single padding and single squeezing; when the sizing machine includes a padding roller and two pairs of sizing rollers and pressure rollers, the padding and squeezing manner is single padding and double squeezing; and when the sizing machine includes two padding rollers and two pairs of sizing rollers and pressure rollers, the padding and squeezing manner is double padding and double squeezing.

In some embodiments, the sized polyester fibers need to be dried and cured to remove excess moisture, and a drying manner includes but is not limited to, a full drum drying, a full drying room drying, and a combination of a drum and a drying room drying.

In some embodiments, a drying temperature for drying and curing the sized polyester fibers is in a range of 80° C. to 120° C. For example, the drying temperature is 80° C., 95° C., or 110° C. The drying temperature and a drying range may also be other optional values or optional ranges.

The surface-modified fibers are polyester fibers treated with the surface treatment agent.

In some embodiments of the present disclosure, surface modification of polyester fibers using the surface treatment agent can increase the percentage of hydrophilic groups on the surface of the fibers and enhance the roughness, making it easier for the finishing agent to be adsorbed on the fibers.

In some embodiments of the present disclosure, nanoparticle material in the surface treatment agent can be cured on the surface of the fibers at the same time as the coating agent, to alter the surface structure of the fibers, thereby altering the hydrophilic properties of the surface of the fibers. The surface of nanoparticle materials has multiple adsorption sites, which can generate strong adsorption interactions with the surface of a proppant. The strong adsorption and bonding properties of the nanoparticles simultaneously act on the proppant, resulting in a tighter binding between the polyester fibers and the proppant, effectively preventing fiber escaping.

Step 140, diluting the finishing agent to obtain a finishing agent solution, and treating the surface-modified fibers with the finishing agent solution to obtain the suspended sand dragging fiber.

In some embodiments, a variety of solutions may be used to dilute the finishing agent, e.g., water.

In some embodiments, a mass percentage of the finishing agent in the finishing agent solution is in a range of 10% to 30%. The mass percentage and range of the finishing agent in the finishing agent solution may also be other optional values or ranges.

In some embodiments, the surface-modified fibers may be treated in a variety of ways to obtain the suspended sand dragging fiber.

The suspended sand dragging fiber refers to a colloid containing fibers with strong sand dragging properties and capable of forming a network structure. The suspended sand dragging fiber can effectively improve the suspending performance of proppants in fracturing fluids and enhance the placement efficiency of the proppants.

The suspending performance reflects the ability of the fracturing fluid to keep the gravel in the proppant in suspension. The slower the gravel settles, the stronger the suspending performance.

In some embodiments, the surface-modified fibers may be cut into target fibers with a preset length, and the target fibers may be mixed with the finishing agent solution and stirred to obtain the suspended sand dragging fiber.

In some embodiments, the target fibers may also be referred to as short fibers.

A stirring manner after adding the target fibers may be the same as the stirring manner in step 110 or other stirring manners. Dispersion of the target fibers in the finishing agent solution may be determined through observation during stirring.

The preset length may be set by staff based on experience. In some embodiments, the preset length is in a range of 3 mm to 9 mm. For example, the preset length may be 3 mm, 5 mm, 8 mm, etc. The preset length and the range may also be other optional values or ranges.

In some embodiments, the target fibers and the finishing agent solution are mixed according to a mass ratio in a range of 6:4 to 8:2. For example, the target fibers and the finishing agent solution are mixed at a mass ratio of 6:4, 7:3, or 8:2. The mass ratio of and the range of the target fibers and the finishing agent solution may also be other optional values or ranges.

In some embodiments, the finishing agent solution may be transferred to a padder trough, the surface-modified fibers are connected to the padder trough, two rollers, and a fiber cutter in sequence, and the surface-modified fibers are cut into the target fibers with a preset length by squeezing and rolling the surface-modified fibers using the two rollers to obtain the suspended sand dragging fibers.

A padding machine is a device used for dewatering water-containing cylindrical fabrics and padding treatment with auxiliary agents. The padding machine includes the padder trough, the roller, or the like.

The padder trough is used to store the finishing agent solution. The roller works similarly to the sizing roller and the pressure roller in the sizing machine, and more information about the roller may be found in the relevant description of step 130.

The fiber cutter is a device for cutting fibers. For example, the fibber cutter includes a rotary hob-type fibber cutter, a guillotine-type fiber cutter, a parallel blade-type fibber cutter, or the like.

The cationic surfactant in the finishing agent not only improves the dispersibility of fibers and enhances their hydrophilicity, but also generates strong adsorption with anionic groups such as carboxyl groups in the polymer of the fracturing fluid, thus enhancing the strength of the network structures formed in fibers, proppants and fracturing fluid, resulting in improved placement performance. In addition, the adsorption layer formed by the alkyl polyether siloxane in the finishing agent on the surface of fibers exhibits good stability and provides a long-lasting effect for the fiber modification.

In some embodiments of the present disclosure, the interaction between the polyester fibers and the proppant is improved through the surface treatment agent, while the dispersibility and mechanical properties of the fibers are enhanced through the finishing agent, which addresses the issues of poor fiber dispersibility, weak suspending properties of proppant, and proppant backflow in fracturing fluids (especially slippery water) during volume fracturing.

Aiming at the problems of poor fiber dispersibility, weak bonding of fibers and proppant, and inability to achieve efficient placement of fibers in fiber fracturing technology, some embodiments of the present disclosure provide a suspended sand dragging fiber, which is prepared by the method for preparing suspended sand dragging fiber.

The suspended sand dragging fiber improves the interaction between polyester fibers and proppant through the surface treatment agent, and at the same time enhances the dispersibility and mechanical properties of the fibers through the finishing agent, which can address the problems of poor dispersibility of the fibers in fracturing fluids and the weak bonding of fibers and proppant and play a key role in the placement process of proppant.

Some embodiments of the present disclosure provide a method for preparing a suspended sand dragging fiber for efficient placement of proppant in a fractured well, the method comprising following steps.

S1, nanoparticles are dispersed into a solvent A, and a coating agent and a flexibilizer are added, stirred for 0.5 h to 1 h, and aged for 24 h to obtain a surface treatment agent; the coating agent is selected from one or more of a silane coupling agent, a polyurethane emulsion, an epoxy resin emulsion, or a styrene-acrylic emulsion; and the flexibilizer is selected from one or more of one or more of polyethylene glycol 600, azelaic acid, or octanoic acid.

S2, a cationic surfactant is added to a solvent B, and then alkyl polyether siloxane is added to the solvent B after the cationic surfactant is completely dissolved in the solvent B, and stirred for 5 min to 30 min to obtain a finishing agent; and the cationic surfactant is selected from one or more of dodecylbenzyldimethylammonium chloride, cetyltrimethylammonium chloride, dodecyldimethylamine oxide, ethylendiaminedi(ditallowdimethylammonium chloride), and alkyl polyether amine;

S3, the surface treatment agent is transferred to a sizing trough of a sizing machine, and polyester fibers are sized through double padding and double squeezing using the sizing machine, and then dried and cured to obtain surface-modified fibers; and S4, the finishing agent is diluted with water to obtain a finishing agent solution, and the surface-modified fibers are treated with the finishing agent solution to obtain the suspended sand dragging fibers.

In some embodiments, the nanoparticles are selected from one or more of nanoparticle silicon dioxide, nanoparticle titanium dioxide, nanoparticle kaolin, and graphene.

In some embodiments, the solvent A is selected from one or more of ethylene glycol butyl ether, glycerol, and water.

In some embodiments, in step S1, a mass percentage of the coating agent is in a range of 0.1% to 10.0%, a mass percentage of the flexibilizer is in a range of 0.1% to 3.0%, a mass percentage of the nanoparticles is in a range of 0.1% to 2.0%, and a remaining is the solvent A, with the sum of the mass percentages being 100%.

In some embodiments, the solvent B is selected from one or more of acetone, ethanol, and deionized water.

In some embodiments, a mass percentage of the cationic surfactant is in a range of 5% to 15.0%, a mass percentage of the alkyl polyether siloxane is in a range of 5% to 15.0%, and a remaining is the solvent B, with the sum of the mass percentages being 100%.

In some embodiments, in step S3, a drying temperature is in a range of 80° C. to 120° C. In some embodiments, in step S4, one of the following two manners is adopted:

Manner 1: the surface-modified fibers are cut into short fibers with a length of 3 mm to 9 mm, the short fibers are mixed with the water-diluted finishing agent solution, and stirred well to obtain the suspended sand dragging fibers.

Manner 2: the water-diluted finishing agent solution is transferred to a padder trough, and the surface-modified fibers are connected to the padder trough, two rollers, and a fiber cutter in sequence, and then the surface-modified fibers are cut into short fibers with a length of 3 mm to 9 mm by squeezing and rolling the surface-modified fibers using the two rollers to obtain the suspended sand dragging fibers.

In some embodiments, in Manner 1 of step S4, the short fibers and the finishing agent solution are mixed according to a mass ratio of 6:4 to 8:2.

Some embodiments of the present disclosure provide a suspended sand dragging fiber for efficient placement of a proppant in a fractured well, which is prepared by the method for preparing a suspended sand dragging fiber for efficient placement of a proppant in a fractured well.

The beneficial effects of the suspended sand dragging fiber for efficient placement of a proppant in a fractured well and a preparation method thereof described herein are described below in connection with specific embodiments and comparison embodiments. It should be understood that the embodiments described below are only for illustrating and explaining the present disclosure and do not constitute a limitation of the present disclosure.

Embodiment 1

Embodiment 1 provides a suspended sand dragging fiber for efficient placement of a proppant in a fractured well, which is prepared the method as follows:

(1) 0.1 kg of nanoparticle silicon dioxide was added to 70 kg of glycerol, 17.9 kg of water was added while stirring, and then 10 kg of γ-glycidoxypropyltrimethoxysilane coupling agent and 2 kg of polyethylene glycol 600 were added in sequence, stirred at 50 r/min for 1 h and aged for 24 h to obtain a surface treatment agent.

(2) 15 kg of dodecylbenzyldimethylammonium chloride was added to 70 kg of water, stirred at 50 r/min, 15 kg of PEG-12 polydimethylsiloxane was added after the dodecylbenzyldimethylammonium chloride was completely dissolved in the water, and stirred for 5 min to obtain a finishing agent.

(3) The surface treatment agent was transferred to a sizing trough of a sizing machine, and polyester fibers were fed into the sizing trough using a yarn guide roller. After padding and squeezing two times, the polyester fibers were introduced into a drying room at a temperature of 120° C., and after drying for 10 min, the polyester fibers were cooled to room temperature to obtain surface-modified fibers.

(4) The surface-modified fibers were drawn and combined using a drafting machine, then cut into short fibers with a length of 3 mm to 9 mm using a fiber cutter.

(5) 40 kg of water was added to 10 kg of finishing agent to formulate a finishing agent solution, and the short fibers and the finishing agent solution were mixed according to a mass ratio of 6:4 and put into a sealed bag to obtain the suspended sand dragging fiber.

Embodiment 2

Embodiment 2 provides a suspended sand dragging fiber for efficient placement of a proppant in a fractured well, which is prepared by the method as follows:

(1) 0.5 kg of nanoparticle kaolin was added to 92.5 kg of water, stirred for 10 min, then 5 kg of non-ionic waterborne polyurethane emulsion and 2 kg of polyethylene glycol 600 were added in sequence, stirred for 1 h at 50 r/min and aged for 24 h to obtain a surface treatment agent.

(2) 15 kg of dodecylbenzyldimethylammonium chloride was added to 70 kg of water, and stirred at 50 r/min, and 15 kg of PEG-12 polydimethylsiloxane was added when the dodecylbenzyldimethylammonium chloride was completely dissolved, and stirred for 10 min to obtain a finishing agent.

(3) The surface treatment agent was transferred to a sizing trough of a sizing machine, and polyester fibers were fed into the sizing trough using a yarn guide roller, after padding and squeezing two times, the polyester fibers were introduced into a drying room at a temperature of 100° C., and after drying for 20 min, the polyester fibers were cooled down to room temperature to obtain surface-modified fibers.

(4) 4 kg of water was added to 1 kg of finishing agent to formulate a finishing agent solution, and the finishing agent solution was transferred to a padder trough. The surface-modified fibers were connected to the padder trough, two rollers, and a fiber cutter in sequence, and the surface-modified fibers were cut into short fibers with a length of 3 mm to 9 mm by squeezing and rolling the surface-modified fibers using the two rollers to obtain the suspended sand dragging fiber.

Embodiment 3

Embodiment 3 provides a suspended sand dragging fiber for efficient placement of a proppant in a fractured well, which is prepared by the method as follows:

(1) 0.5 kg of nanoparticle titanium dioxide was added to 87.5 kg of ethylene glycol butyl ether, stirred for 10 min, then 10 kg of styrene-acrylic emulsion and 2 kg of polyethylene glycol 600 were added in sequence, stirred for 1 h at 50 r/min and aged for 24 h to obtain a surface treatment agent.

(2) 15 kg of ethylene bis(hexadecyl dimethyl ammonium chloride) was added to 70 kg of water, stirred at 50 r/min, 15 kg of PEG-12 polydimethylsiloxane was added when the ethylene bis(hexadecyl dimethyl ammonium chloride) was completely dissolved, and stirred for 20 min to obtain a finishing agent.

(3) The surface treatment agent was transferred to a sizing trough of a sizing machine, polyester fibers were fed into the sizing trough using a yarn guide roller, and after padding and squeezing two times, the polyester fibers were introduced into a drying room at a temperature of 100° C., after drying for 30 min, the polyester fibers were cooled down to room temperature to obtain surface-modified fibers.

(4) 4 kg of water was added to 1 kg of the finishing agent to formulate a finishing agent solution, and the finishing agent solution was transferred to a padder trough. The surface-modified fibers were connected to the padder trough, two rollers, and a fiber cutter in sequence, and the surface-modified fibers were cut into short fibers with a length of 3 mm to mm by squeezing and rolling the surface-modified fibers using the two rollers to obtain the suspended sand dragging fiber.

Embodiment 4

Embodiment 4 provides a suspended sand dragging fiber for efficient placement of a proppant in a fractured well, which is prepared by the method as follows:

(1) 0.1 kg of nanoparticle silicon dioxide was added to 10 kg of glycerol, 77.9 kg of water was added while stirring, and then 10 kg of styrene-acrylic emulsion and 2 kg of sebacic acid were added in sequence, stirred at 50 r/min for 1 h and aged for 24 h to obtain a surface treatment agent.

(2) 15 kg of dodecylbenzylammonium chloride was added to 70 kg of water, and stirred at 50 r/min, and 15 kg of PEG-12 polydimethylsiloxane was added after the dodecylbenzylammonium chloride was completely dissolved, and stirred for 30 min to obtain a finishing agent.

(3) The surface treatment agent was transferred to a sizing trough of a sizing machine, and polyester fibers were fed into the sizing trough using a yarn guide roller, after padding and squeezing two times, the polyester fibers were introduced into a drying room at a temperature of 100° C., and after drying for 30 min, the polyester fibers were cooled down to room temperature to obtain surface-modified fibers.

(4) 4 kg of water was added to 1 kg of finishing agent to formulate a finishing agent solution, and the finishing agent solution was transferred to a padder trough. The surface-modified fibers were connected to the padder trough, two rollers, and a fiber cutter in sequence, and the surface-modified fibers were cut into short fibers with a length of 3 mm to 9 mm by squeezing and rolling the surface-modified fibers using the two rollers to obtain the suspended sand dragging fiber.

Embodiment 5

Embodiment 5 provides a suspended sand dragging fiber for efficient placement of a proppant in a fractured well, which is prepared by the method as follows:

(1) 0.1 kg of nano alumina was added to 10 kg of glycerol, 77.9 kg of water was added while stirring, then 10 kg of styrene-acrylic emulsion and 2 kg of octanoic acid were added in sequence, stirred at 50 r/min for 1 h and aged for 24 h to obtain a surface treatment agent.

(2) 15 kg of dodecylbenzyldimethylammonium chloride was added to 70 kg of water, and stirred at 50 r/min, and 15 kg of PEG-12 polydimethylsiloxane was added after the dodecylbenzyldimethylammonium chloride was completely dissolved, and stirred for 30 min to obtain a finishing agent.

(3) The surface treatment agent was transferred to a sizing trough of a sizing machine, and polyester fibers were fed into the sizing trough using a yarn guide roller, after padding and squeezing two times, the polyester fibers were introduced into a drying room at a temperature of 100° C., and after drying for 30 min, the polyester fibers were cooled down to room temperature to obtain surface-modified fibers.

(4) 4 kg of water was added to 1 kg of finishing agent to formulate a finishing agent solution, and the finishing agent solution was transferred to a padder trough. The surface-modified fibers were connected to the padder trough, two rollers, and a fiber cutter in sequence, and the surface-modified fibers were cut into short fibers with a length of 3 mm to 9 mm by squeezing and rolling the surface-modified fibers using the two rollers to obtain the suspended sand dragging fiber.

Embodiment 6

Embodiment 6 provides a suspended sand dragging fiber for efficient placement of a proppant in a fractured well, which is prepared by the method as follows:

(1) 0.1 kg of nanoparticle silicon dioxide was added to 70 kg of glycerol, 17.9 kg of water was added while stirring, and then 10 kg of γ-glycidoxypropyltrimethoxysilane coupling agent and 2 kg of polyethylene glycol 600 were added in sequence, stirred at 50 r/min for 1 h and aged for 24 h to obtain a surface treatment agent.

(2) 15 kg of cetyltrimethylammonium chloride was added to 70 kg of water, stirred at 50 r/min, 15 kg of PEG-12 polydimethylsiloxane was added when the cetyltrimethylammonium chloride was completely dissolved, and stirred for 30 min to obtain a finishing agent.

(3) The surface treatment agent was transferred to a sizing trough of a sizing machine, and polyester fibers were fed into the sizing trough using a yarn guide roller, after padding and squeezing two times, the polyester fibers were introduced into a drying room at a temperature of 100° C., and after drying for 30 min, the polyester fibers were cooled down to room temperature to obtain surface-modified fibers.

(4) 4 kg of water was added to 1 kg of the finishing agent to formulate a finishing agent solution, and the finishing agent solution was transferred to a padder trough. The surface-modified fibers were connected to the padder trough, two rollers, and a fiber cutter in sequence, and the surface-modified fibers were cut into short fibers with a length of 3 mm to 9 mm by squeezing and rolling the surface-modified fibers using the two rollers to obtain the suspended sand dragging fiber.

Embodiment 7

Embodiment 7 provides a suspended sand dragging fiber for efficient placement of a proppant in a fractured well, which is prepared by the method as follows:

(1) 0.1 kg of nanoparticle silicon dioxide was added to 70 kg of glycerol, 17.9 kg of water was added while stirring, and then 10 kg of γ-glycidoxypropyltrimethoxysilane coupling agent and 2 kg of polyethylene glycol 600 were added in sequence, stirred at 50 r/min for 1 h and aged for 24 h to obtain a surface treatment agent.

(2) 15 kg of dodecyldimethylamine oxide was added to 70 kg of water, stirred at 50 r/min, 15 kg of PEG-12 polydimethylsiloxane was added after the dodecyldimethylamine oxide was completely dissolved, and stirred for 30 min to obtain a finishing agent.

(3) The surface treatment agent was transferred to a sizing trough of a sizing machine, and polyester fibers were fed into the sizing trough using a yarn guide roller, after padding and squeezing two times, the polyester fibers were introduced into a drying room at a temperature of 100° C., and after drying for 30 min, the polyester fibers were cooled down to room temperature to obtain surface-modified fibers.

(4) 4 kg of water was added to 1 kg of the finishing agent to formulate a finishing agent solution, and the finishing agent solution was transferred to a padder trough. The surface-modified fibers were connected to the padder trough, two rollers, and a fiber cutter in sequence, and the surface-modified fibers were cut into short fibers with a length of 3 mm to 9 mm by squeezing and rolling the surface-modified fibers using the two rollers to obtain the suspended sand dragging fiber.

Embodiment 8

Embodiment 8 provides a suspended sand dragging fiber for efficient placement of a proppant in a fractured well, which is prepared by the method as follows:

(1) 0.1 kg of nanoparticle silicon dioxide was added to 70 kg of glycerol, 17.9 kg of water was stirred while stirring, and then 10 kg of γ-glycidoxypropyltrimethoxysilane coupling agent and 2 kg of polyethylene glycol 600 were added in sequence, stirred at 50 r/min for 1 h and aged for 24 h to obtain a surface treatment agent.

(2) 15 kg of dodecyl polyether amine was added to 70 kg of water, stirred at 50 r/min, 15 kg of PEG-12 polydimethylsiloxane was added after the dodecyl polyether amine was completely dissolved, and stirred for 30 min to obtain a finishing agent.

(3) The surface treatment agent was transferred to a sizing trough of a sizing machine, and polyester fibers were fed into the sizing trough using a yarn guide roller, after padding and squeezing two times, the polyester fibers were introduced into a drying room at a temperature of 100° C., and after drying for 30 min, the fiber polyesters were cooled down to room temperature to obtain surface-modified fibers.

(4) 4 kg of water was added to 1 kg of finishing agent to formulate a finishing agent solution, and the finishing agent solution was transferred to a padder trough. The surface-modified fibers were connected to the padder trough, two rollers, and a fiber cutter in sequence, and the surface-modified fibers were cut into short fibers with a length of 3 mm to 9 mm by squeezing and rolling the surface-modified fibers using the two rollers to obtain the suspended sand dragging fiber.

Comparison Embodiment 1

Comparison embodiment 1 provides a suspended sand dragging fiber for efficient placement of a proppant in a fractured well, and a method for preparing the suspended sand dragging fiber was essentially the same as the method for preparing the suspended sand dragging fiber in Embodiment 1, with the difference being that Comparison embodiment 1 was not treated with a finishing agent, i.e., step 2 and step 5 of Embodiment 1 were omitted. Surface-modified fibers were directly cut into short fibers with a length of 6 mm as the suspended sand dragging fiber.

Comparison Embodiment 2

Comparison embodiment 2 provides a method for preparing a suspended sand dragging fiber for efficient placement of a proppant in a fractured well, and a method for preparing for preparing the suspended sand dragging fiber was essentially the same as the method for preparing the suspended sand dragging fiber in Embodiment 1, with a difference being that the Comparison embodiment 2 was not treated with a surface treatment agent, i.e., step 1 and step 3 of Embodiment 1 were omitted. Polyester fibers were directly cut into short fibers with a length of 6 mm, and then the short fibers and a finishing agent solution were mixed according to a mass ratio of 6:4, and put into a sealed bag to obtain the suspended sand dragging fiber.

Comparison Embodiment 3

Comparison embodiment 3 provides a suspended sand dragging fiber for efficient placement of a proppant in a fractured well, and a method for preparing the suspended sand dragging fiber was essentially the same as the method for preparing the suspended sand dragging fiber in Embodiment 1, with the difference being that Comparison embodiment 3 is not treated with a surface treatment agent and a finishing agent, and polyester fibers were directly cut into short fibers with a length of 6 mm to obtain the suspended sand dragging fiber.

To verify the superiority of the method for preparing the suspended sand dragging fiber for efficient placement of a proppant in a fractured well in the present disclosure, performance testing experiments needed to be conducted on suspended sand dragging fibers prepared according to the Embodiments and Comparison embodiments. The performance testing experiments included but are not limited to, microscopic experiments, macroscopic experiments, placement experiments, etc.

The test manner for the microscopic experiments included observing the microstructure of the suspended sand dragging fiber prepared in Embodiment 1 and the suspended sand dragging fibers prepared in comparison embodiments 1 to 3 using a high magnification microscope.

FIG. 2 is a diagram illustrating comparison of microstructures of fibers before and after treatment according to some embodiments of the present disclosure. In the FIG. 2, (a) shows to a microstructure of the suspended sand dragging fiber prepared in Embodiment 1, (b) shows a microstructure of the suspended sand dragging fiber prepared in Comparison embodiment 1, (c) shows a microstructure of the suspended sand dragging fiber prepared in Comparison embodiment 2, and (d) shows a microstructure of the suspended sand dragging fiber prepared in Comparison embodiment 3. As shown in FIG. 2, surfaces of the fibers prepared in Embodiment 1 and Comparison embodiment 1 are covered with a film, whereas surfaces of the fibers prepared in Comparsion embodiment 2 and Comparison embodiment 3 do not have such a structure, suggesting that a surface treatment agent contributes to the alteration of the surface structure of the fibers.

A test manner for the macroscopic experiments was as follows: taking 0.1 g of the suspended sand dragging fibers prepared in Embodiment 1 and Comparison embodiments 1 to 3, respectively, and adding them to a square glass dish containing 100 mL of water, and stirring them three rotations with a glass rod to observe the dispersibility of the fibers.

Figure 3:
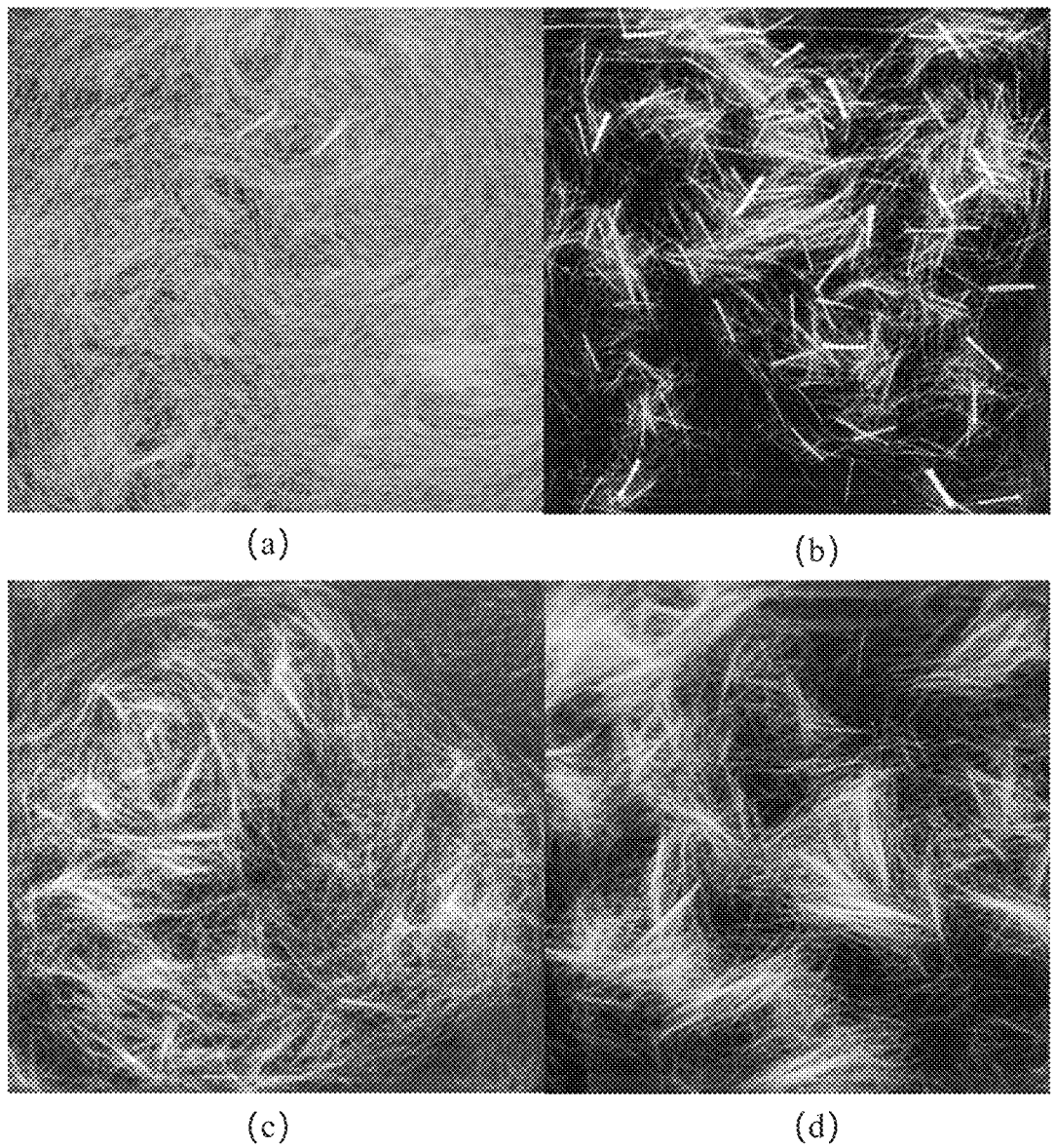
FIG. 3 is a diagram illustrating comparison of macroscopic dispersibility of fibers before and after treatment according to some embodiments of the present disclosure.

FIG. 3 is a diagram illustrating comparison of macroscopic dispersibility of fibers before and after treatment according to some embodiments of the present disclosure. In the FIG. 3, (a) shows a macroscopic dispersibility of the suspended sand dragging fiber prepared in Embodiment 1, (b) shows a macroscopic dispersibility of the suspended sand dragging fiber prepared in Comparison embodiment 1, (c) shows a macroscopic dispersibility of the suspended sand dragging fiber prepared in Comparison embodiment 2, and (d) shows a macroscopic dispersibility of the suspended sand dragging fiber prepared in Comparison embodiment 3. As shown in FIG. 3, the dispersibility of the suspended sand dragging fiber in Embodiment 1 is significantly better than suspended sand dragging fibers prepared in Comparison embodiments 1 to 3. It can be seen that the combination of a surface treatment agent and a finishing agent can effectively improve the dispersibility of fibers.

The placement experiment refers to applying suspended sand dragging fibers prepared in Embodiments 1 to 8 and Comparison embodiments 1 to 3 to the implementation process of the high-efficiency placement technology of the proppant, and measuring the effect of the suspended sand dragging fiber in the slippery water on the placement volume and the fiber migration rate of the proppant. The test manner was as follows:

(1) two dry 100 mL measuring cylinders were taken, noted as measuring cylinder 1 and measuring cylinder 2. Another measuring cylinder 3 was taken, and 100 mL of slippery water was measured and added to each of two 250 ml beakers, and the two 250 mL beakers were recorded as beaker 1 and beaker 2.

(2) Experiment 1: beaker 1 was transferred to a vertical stirrer (set at 700 r/min), stirring while 15.00 g of proppant was added to beaker 1. The beaker 1 was stirred for 2 min to ensure that the proppant was uniformly distributed in the slippery water. After stopping the stirring, beaker 1 was quickly removed, and the slippery water in beaker 1 was stirred using a glass rod and poured from beaker 1 into measuring cylinder 1. Measuring cylinder 1 was placed on a horizontal platform and the timer started. After 5 min, when the proppant was completely settled, the placement volume of the proppant was read and served as a control group.

(3) 0.075 g of suspended sand dragging fiber was weighed and put in beaker 2, the mass of the suspended sand dragging fiber was recorded as mo. Beaker 2 was transferred to a vertical stirrer (set at speed 700 r/min), stirring while 15.00 g of proppant was weighed and added to beaker 2. Beaker 2 was stirred for 2 min to ensure that the proppant and the suspended sand dragging fiber was uniformly distributed in the slippery water. After stopping the stirring, beaker 2 was quickly removed, and the slippery water in beaker 2 was stirred using a glass rod and poured from beaker 2 into measuring cylinder 2. Measuring cylinder 2 was placed on a horizontal table and the timer started. After 5 min, when the proppant was completely settled, the placement volume of the proppant was read.

(4) Supernatant and floating suspended sand dragging fiber in measuring cylinder 2 were poured into a 20-mesh filter. After washing and drying, the suspended sand dragging fiber was weighed. The mass of the suspended sand dragging fiber after washing and drying was recorded as $m_2$, and the fiber escape rate $\eta$ of the suspended sand dragging fiber was calculated by equation (1).

$$\eta = \frac{m_2}{m_0} \quad (1)$$

Experiments were carried out according to step (3) and step (4) using the suspended sand dragging fibers prepared in Embodiments 1 to 8 and Comparison embodiments 1 to 3 in turn, which are numbered in turn as Experiments 2 to 12.

The range of experimental conditions was as follows: a viscosity of slippery water was 6 mPa·s, the sand ratio was 20%, the uniformly used suspended sand dragging fiber has a length of 6 mm with a dosage of 0.5%, and the proppant used was quartz sand with a mesh size of 70 to 140. The test results are shown in Table 1.

mance of the fibers, and only when the surface treatment agent and the finishing agent are used together to treat polyester fibers, the obtained suspended sand dragging fiber can achieve the best performance, which can significantly increase the placement volume of the proppant and significantly reduce the fiber escape rate of the suspended sand dragging fiber.

The above description is merely the preferred embodiment of the present disclosure and does not impose any form of limitation on it. Although the preferred embodiment is disclosed as above, it is not intended to limit the scope of the present disclosure. Any skilled person in the art, without departing from the technical solution of the present disclosure, can make slight modifications or adjustments to the disclosed technical content, resulting in equivalent variations. Any simple modifications, equivalent changes, and adjustments made to the above embodiments, as long as they do not depart from the technical solution of the present disclosure, shall still fall within the scope of the technical solution of the present disclosure.

Furthermore, unless expressly stated in the claims, the order of the processing elements and sequences, the use of numerical letters, or the use of other names as described in the present disclosure are not intended to qualify the order of the processes and methods of the present disclosure. While some embodiments of the disclosure that are currently considered useful are discussed in the foregoing disclosure by way of various examples, it should be appreciated that such details serve only illustrative purposes and that additional claims are not limited to the disclosed embodiments, rather, the claims are intended to cover all amendments and equivalent combinations that are consistent with the substance and scope of the embodiments of the present disclosure. For example, although the implementation of various components described above may be embodied in a hardware device, it may also be implemented as a software-only solution, e.g., an installation on an existing server or mobile device.

TABLE 1

Results of placement experiments

| No. | 1 | 2 | 3 | 4 | 5 | 6 | 7 | 8 | 9 | 10 | 11 | 12 |
|---|---|---|---|---|---|---|---|---|---|---|---|---|
| Suspended sand dragging fiber | Control group | Embodiment 1 | Embodiment 2 | Embodiment 3 | Embodiment 4 | Embodiment 5 | Embodiment 6 | Embodiment 7 | Embodiment 8 | Comparison embodiment 1 | Comparison embodiment 2 | Comparison embodiment 3 |
| Effective placement volume (mL) | 20 | 34 | 35 | 38 | 35 | 38 | 31 | 34 | 35 | 27 | 25 | 24 |
| Fiber escape rate (%) | — | 25.8 | 27.9 | 30.2 | 26.4 | 29.8 | 24.1 | 27.9 | 26.5 | 29.6 | 32.4 | 64.7 |

As can be seen from data in Table 1, when the suspended sand dragging fibers prepared in Embodiments 1 to 8 are used in conjunction with the proppant, the effective placement volume of the proppant is significantly greater than suspended sand dragging fibers prepared in Comparison embodiments 1 to 3 and the control group, and a fiber escape rate of the suspended sand dragging fibers prepared in Embodiments 1 to 8 is significantly lower than the suspended sand dragging fibers in Comparison embodiments 1 to 3, which indicates that performance of the suspended sand dragging fiber prepared using the method for preparing a suspended sand dragging fiber for efficient placement of a proppant in a fractured well in some embodiments of the present disclosure is significantly better than suspended sand dragging fibers prepared in Comparison embodiments 1 to 3. As can be known from the Comparison embodiments 1 to 3, polyester fibers treated with a surface treatment agent or a finishing agent alone can only slightly improve the perfor- Similarly, it should be noted that in order to simplify the presentation of the present disclosure, and thereby aid in the understanding of one or more embodiments of the disclosure, the foregoing descriptions of embodiments of the present disclosure sometimes group multiple features together in a single embodiment, accompanying drawings, or in a description thereof. However, this method of disclosure does not imply that the objects of the present disclosure require more features than those mentioned in the claims. Rather, claimed subject matter may lie in less than all features of a single foregoing disclosed embodiment.

Finally, it should be understood that the embodiments described in the present disclosure are only used to illustrate the principles of the embodiments of the present disclosure. Other deformations may also fall within the scope of the present disclosure. As such, alternative configurations of embodiments of the present specification may be viewed as consistent with the teachings of the present specification as an example, not as a limitation. Correspondingly, the embodiments of the present specification are not limited to the embodiments expressly presented and described herein.

What is claimed is:

1. A method for preparing a suspended sand dragging fiber for efficient placement of proppant in a fractured well, comprising:
- S1, dispersing nanoparticles into a solvent A, adding a coating agent and a flexibilizer to the solvent A, stirring for 0.5 h to 1 h and aging for 24 h to obtain a surface treatment agent; wherein the coating agent includes one or more of a silane coupling agent, a polyurethane emulsion, and a styrene-acrylic emulsion, the flexibilizer includes one or more of polyethylene glycol 600, azelaic acid, and octanoic acid, the nanoparticles include one or more of nanoparticle silicon dioxide, nanoparticle titanium dioxide, nanoparticle kaolin, and nano alumina, and the solvent A includes one or more of ethylene glycol butyl ether, glycerol, and water;
- wherein a mass percentage of the coating agent is in a range of 0.1% to 10.0%, a mass percentage of the flexibilizer is in a range of 0.1% to 3.0%, a mass percentage of the nanoparticles is in a range of 0.1% to 2.0%, and a remaining is the solvent A, with a total of 100%;
- S2, adding a cationic surfactant to a solvent B, adding an alkyl polyether siloxane to the solvent B after the cationic surfactant is dissolved in the solvent B, and stirring for 5 min to 30 min to obtain a finishing agent; wherein the cationic surfactant includes one or more of dodecylbenzyldimethylammonium chloride, cetyltrimethylammonium chloride, dodecyldimethylamine oxide, ethylenediamine ditallow dimethyl ammonium chloride and alkyl polyether amines, and the solvent B includes one or more of acetone, ethanol, and deionized water;
- wherein a mass percentage of the cationic surfactant is in a range of 5% to 15.0%, a mass percentage of the alkyl polyether siloxane is in a range of 5% to 15.0%, and a remaining is the solvent B, with a total of 100%;
- S3, transferring the surface treatment agent to a sizing trough of a sizing machine, sizing polyester fibers through double padding and double squeezing using the sizing machine, and drying and curing to obtain surface-modified fibers; and
- S4, diluting the finishing agent to obtain a finishing agent solution, and treating the surface-modified fibers with the finishing agent solution to obtain the suspended sand dragging fiber.

2. The method of claim 1, wherein in S3, a temperature for drying is in a range of 80° C. to 120° C.

3. The method of claim 1, wherein S4 includes:
- process 1: cutting the surface-modified fibers into short fibers with a length of 3 mm to 9 mm, mixing the short fibers with the finishing agent solution, and stirring to obtain the suspended sand dragging fiber; or
- process 2: transferring the finishing agent solution to a padder trough, connecting the surface-modified fibers to the padder trough, two rollers, and a fiber cutter, and cutting the surface-modified fibers to the short fibers with a length of 3 mm to 9 mm by squeezing and rolling the surface-modified fibers using the two rollers to obtain the suspended sand dragging fiber.

4. The method of claim 3, wherein in S4, the short fibers and the finishing agent solution are mixed according to a mass ratio in a range of 6:4 to 8:2.

5. A suspended sand dragging fiber for efficient placement of proppant in a fractured well, which is prepared by the method of claim 1.

* * * * *